United States Patent
Gopal et al.

(10) Patent No.: US 9,782,722 B2
(45) Date of Patent: Oct. 10, 2017

(54) NITROUS OXIDE DECOMPOSITION CATALYST

(71) Applicant: SHELL OIL COMPANY, Houston, TX (US)

(72) Inventors: Srikant Gopal, Bengaluru (IN); Andreas Klemt, Leipzig (DE); Ralf Schricker, Leuna (DE); Madhusudhan Rao Panchagnula, Bangalore (IN)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/908,142

(22) PCT Filed: Jul. 29, 2014

(86) PCT No.: PCT/EP2014/066317
§ 371 (c)(1),
(2) Date: Jan. 28, 2016

(87) PCT Pub. No.: WO2015/014863
PCT Pub. Date: Feb. 5, 2015

(65) Prior Publication Data
US 2016/0199817 A1    Jul. 14, 2016

(30) Foreign Application Priority Data
Jul. 31, 2013   (IN) ............... 3457/CHE/2013

(51) Int. Cl.
*B01J 21/04*    (2006.01)
*B01J 23/02*    (2006.01)
(Continued)

(52) U.S. Cl.
CPC .......... *B01D 53/8628* (2013.01); *B01J 23/80* (2013.01); *B01J 35/002* (2013.01);
(Continued)

(58) Field of Classification Search
CPC ... B01J 21/04; B01J 23/02; B01J 23/04; B01J 23/06; B01J 23/75; B01J 23/78; B01J 23/80; B01J 35/002
(Continued)

(56) References Cited

U.S. PATENT DOCUMENTS 3,988,263 A * 10/1976 Hansford ............. B01D 53/864
502/332
3,997,582 A    12/1976 Khera
(Continued)

FOREIGN PATENT DOCUMENTS

JP    H110165818    6/1998
WO    2005110582    11/2005
WO    2009142520    11/2009

OTHER PUBLICATIONS

Pimgruber, G. et al.; "The synergy between Fe and Ru in N2O decomposition over FeRu-FER catalysts: A mechanistic explanation"; Journal of Catalysis; vol. 243; pp. 340-349; 2006.
(Continued)

*Primary Examiner* — Cam N. Nguyen
(74) *Attorney, Agent, or Firm* — James D. Carruth; Charles W. Stewart (57) ABSTRACT

The present invention provides a catalyst for the decomposition of nitrous oxide, said catalyst comprising oxides of cobalt, zinc and aluminum and an alkali metal promoter.

14 Claims, 8 Drawing Sheets

Results for Example 3

(51) Int. Cl.
　　　B01J 23/04　　　(2006.01)
　　　B01J 23/06　　　(2006.01)
　　　B01J 23/75　　　(2006.01)
　　　B01J 23/78　　　(2006.01)
　　　B01J 23/80　　　(2006.01)
　　　B01J 35/00　　　(2006.01)
　　　B01D 53/86　　　(2006.01)
　　　B01J 37/02　　　(2006.01)
　　　B01J 37/08　　　(2006.01)
　　　B01J 37/03　　　(2006.01)
　　　B01J 35/02　　　(2006.01)
　　　B01J 37/00　　　(2006.01)

(52) U.S. Cl.
　　　CPC ......... *B01J 35/0026* (2013.01); *B01J 35/023* (2013.01); *B01J 37/0009* (2013.01); *B01J 37/0207* (2013.01); *B01J 37/0236* (2013.01); *B01J 37/031* (2013.01); *B01J 37/08* (2013.01); *B01D 2255/202* (2013.01); *B01D 2255/2092* (2013.01); *B01D 2255/20746* (2013.01); *B01D 2255/20792* (2013.01); *B01D 2257/402* (2013.01); *B01D 2258/0283* (2013.01); *B01J 2523/00* (2013.01); *Y02C 20/10* (2013.01)

(58) Field of Classification Search
　　　USPC .................................. 502/327–330, 332, 355
　　　See application file for complete search history.

(56)　　　　　　　　References Cited

U.S. PATENT DOCUMENTS

| | | | | |
|---|---|---|---|---|
| 4,005,177 A * | 1/1977 | Weidenbach | ......... | B01D 53/34 423/212 |
| 4,039,302 A | 8/1977 | Khera | | |
| 4,077,995 A | 3/1978 | Khera | | |
| 5,171,553 A | 12/1992 | Li et al. | | |
| 5,336,656 A * | 8/1994 | Campbell | ......... | B01J 23/8913 502/329 |
| 5,407,652 A | 4/1995 | Swamy et al. | | |
| 5,472,677 A | 12/1995 | Farris et al. | | |
| 5,502,019 A * | 3/1996 | Augustine | ......... | B01D 53/8668 502/183 |
| 5,705,136 A | 1/1998 | Drago et al. | | |
| 5,736,114 A * | 4/1998 | Barthe | ............... | B01D 53/9418 423/213.2 |
| 5,750,460 A * | 5/1998 | Hartweg | ............ | B01D 53/9418 502/340 |
| 5,965,099 A * | 10/1999 | Hartweg | ............ | B01D 53/9418 423/212 |
| 6,069,111 A * | 5/2000 | Yamamoto | ........... | B01D 53/945 502/324 |
| 6,153,161 A * | 11/2000 | Fetzer | ................ | B01D 53/9418 423/213.2 |
| 6,218,335 B1 * | 4/2001 | Okada | ................... | B01J 23/005 423/604 |
| 6,846,471 B2 * | 1/2005 | Hotta | ................. | B01D 53/8628 423/239.1 |
| 7,605,108 B2 * | 10/2009 | Wakamatsu | ............. | B01J 23/40 502/302 |
| 7,713,911 B2 * | 5/2010 | Wakamatsu | ......... | B01J 23/8913 502/245 |
| 8,088,708 B2 * | 1/2012 | Takatsu | .................... | B01J 23/80 208/213 |

OTHER PUBLICATIONS

Yan, L. et al.; "Excellent catalytic performance of ZnxCo1-xC2O4 spinel catalysts for the decomposition of nitrous oxide"; Catalysis Communications; vol. 4; pp. 505-509; 2003.

Asano, K. et al.; "Potassium-doped Co3O4 catalyst for direct decomposition of N2O"; Applied Catalysis B: Environmental; vol. 78, No. 8; pp. 242-249; 2008.

Yoshino, H. et al.; "Optimized synthesis method for K/Co3O4 catalyst towards direct decomposition of N2O" J. Mater. Sci.; vol. 46; pp. 797-805; 2011.

Stelmachowski, P. et al.; Optimization of Multicomponent Cobalt Spinel Catalyst for N2O Abatement from Nitrc Acid Plant Tail Gases: Laboratory and Pilot Plant Studies; Catalyst Letters; vol. 130; pp. 637-641; 2009.

Inger, M. et al.; "Laboratory and pilot scale synthesis, characterizatoin and reactivity of multicomponent cobalt spinel catalyst for low temperature removal of N2) from nitric acid plant tail gases"; Catalysis Today; vol. 176; pp. 365-368, 2011.

Ohnishi, C. et al.; "Alkali-doped Co3O4 catalysts for direct decomposition of N2) in the present of oxygen"; Catalysis Today; vol. 120; pp. 145-150; 2007.

Pasha, N. et al.; "Studies on cesium doped cobalt oxide catalysts for direct N2) decomposition in the presence of oxygen and steam"; Catalysis Communications; vol. 10; pp. 132-136; 2008.

Stelmachowski, P. et al.; "Strong electronic promotion of Co3O4 towards N2O decomposition by surface alkali dopants"; Catalysis Communications; vol. 10; pp. 1062-1065; 2009.

* cited by examiner

Figure 1 – Results for Example 3

NITROUS OXIDE DECOMPOSITION CATALYST

PRIORITY CLAIM

The present application is the National Stage (§371) of International Application No. PCT/EP2014/066317, filed Jul. 29, 2014, which claims priority from Indian Patent Application No. 3457/CHE2013, filed Jul. 31, 2013 incorporated herein by reference.

FIELD OF THE INVENTION

The invention relates to a catalyst for the decomposition of nitrous oxide ($N_2O$), a process for the production of said catalyst and a process for the decomposition of nitrous oxide in the presence of said catalyst.

BACKGROUND OF THE INVENTION

Nitrous oxide ($N_2O$) is a greenhouse gas which has 310 times more impact per unit weight than carbon dioxide. It is produced as a by-product in a number of industrial processes including the manufacture of chemicals such as nitric acid.

In many countries limits on nitrous oxide emissions have been set and efforts have been focussed on developing methods to remove nitrous oxide from flue gasses. Many of these efforts have focussed on identifying catalysts suitable for use in the catalytic decomposition of nitrous oxides.

Zeolite-supported iron catalysts, optionally also containing a noble metal such as Pt or Ru, have been described, for example in U.S. Pat. No. 5,171,553, WO 2005/110582 and Journal of Catalysis 243 (2006), 340-349. The major disadvantage of such catalysts is their limited operating window. At temperatures below 400° C., the activity of zeolite-based catalysts become inhibited by water present in the feed. Further, at temperatures above about 600° C. the hydrothermal stability of the zeolite becomes adversely affected.

Other known nitrous oxide decomposition catalysts include those based on base metal oxides such as $Co_3O_4$, as described in U.S. Pat. No. 5,705,136. Additional metals, such as nickel, manganese, zinc or magnesium, may be incorporated into the base metal oxide structure as described in Catalysis Communications 4 (2003) 505-509. The addition of alkali-metal promoters to further enhance the catalytic activity of these materials is described in the following documents: Applied Catalysis B: Environmental 78 (008) 242-249; J. Mater. Sci. 46 (2011), 797-805; WO 2009142520, Catalyst Letters, 130 (2009), 637-641; Catalysis Today, 176 (2011), 365-368; Catalysis Today 120, (2007), 145-150; Catalysis Communications, 10 (2008), 132-136; and Catalysis Communications 10 (2009), 1062-1065. Base metal oxides overcome some of the operating window problems associated with zeolite-based catalysts. However, they can have a high bulk density leading to a very high and economically unattractive mass of catalyst required per unit reactor volume.

It would, therefore, be desirable to provide a catalyst suitable for the decomposition of nitrous oxide which can be used at a wide range of temperatures with good stability and life and also has good mechanical properties for a wide range of applications.

SUMMARY OF THE INVENTION

Accordingly, the present invention provides a catalyst for the decomposition of nitrous oxide, said catalyst comprising oxides of cobalt, zinc and aluminium and an alkali metal promoter.

The present invention also provides a process for the preparation of said catalyst, said process comprising the steps of:
i) providing an aqueous solution comprising metal salts of zinc, cobalt and aluminium;
ii) precipitating the bulk metal oxide using an aqueous alkaline solution;
iii) drying the precipitated material;
iv) forming catalyst particles from the precipitated material; and
v) calcining the thus-formed catalyst particles,
wherein an alkali metal promoter is added during or after at least one of steps i) to v).

The present invention also provides a process for the decomposition of nitrous oxide in a gas stream said process comprising the steps of:
i) providing a gas stream containing in the range of from 50 ppmw to 50 wt % of nitrous oxide;
ii) contacting said gas stream with the catalyst of the invention at a temperature in the range of from 250 to 750° C.

DETAILED DESCRIPTION OF THE INVENTION

The present inventors have surprisingly found that a bulk metal oxide catalyst comprising at least cobalt, zinc and aluminium as metals and promoted with an alkali metal provides an excellent combination of high activity in the decomposition of nitrous oxide, good activity at low temperatures (less than 400° C.) and at high temperatures (greater than 650° C.) with high stability even in the presence of increased water and ammonia concentrations and good physical properties. The catalysts of the invention have high tolerance to water present in gas streams and also work well at a range of NO and $NO_2$ concentrations in the gas stream to be treated. The catalyst has a lower bulk density and higher strength than bulk metal oxide catalysts previously described for the decomposition of nitrous oxide. The catalyst also has improved extrusion properties.

The catalyst of the invention comprises at least cobalt, zinc and aluminium within a mixed metal oxide. The catalyst contains at least 20 wt % cobalt, preferably at least 30 wt % cobalt, more preferably at least 35 wt % cobalt and at most 75 wt % cobalt, preferably at most 70 wt % cobalt, more preferably at most 60 wt % cobalt, when considered as an element in the overall catalyst.

The catalyst contains at least 3 wt % zinc, preferably at least 5 wt % zinc, more preferably at least 7 wt % zinc and at most 20 wt % zinc, preferably at most 15 wt % zinc, more preferably at most 12 wt % zinc when considered as an element in the overall catalyst.

Regarding the aluminium present in the catalyst as a precipitated oxide, the catalyst contains at least 2 wt % of such aluminium, preferably at least 3 wt % of such aluminium and at most 20 wt % of such aluminium, preferably at most 15 wt % of such aluminium, when considered as an element in the overall catalyst. Other aluminium may be present in the finished catalyst, e.g. that present in the form of a binder.

The cobalt, zinc and aluminium are present in the form of a mixed metal oxide. Said mixed metal oxide may contain a number of different oxidic species, each containing at least one of the metals. At least a part of the mixed metal oxide will have a spinel-type structure.

The alkali metal promoter is preferably selected from lithium, sodium, potassium, cesium and mixtures thereof. More preferably the alkali metal promoter is selected from sodium, potassium, cesium and mixtures thereof. Even more preferably the alkali metal promoter is selected from cesium, potassium and mixtures thereof. Even more preferably the alkali metal promoter comprises potassium. Most preferably, the alkali metal promoter is potassium.

Suitably the alkali metal promoter is present in the catalyst in an amount of at least 0.1 wt %, preferably in an amount of at least 0.2 wt %, more preferably in an amount of at least 0.5 wt %, most preferably in an amount of at least 0.9 wt % when considering the element in the overall catalyst. Suitably the alkali metal promoter is present in the catalyst in an amount of at most 5 wt %, preferably in an amount of at most 4 wt %, most preferably in an amount of at most 3 wt % when considering the element in the overall catalyst.

As well as the bulk metal oxide and promoter, the catalyst of the invention may contain other materials such as a binder. If present, the binder may be selected from the group of alkaline earth metal oxides, rare earth metal oxides, alumina, zinc oxide, magnesium oxide, silica and mixtures thereof. Preferably, the binder is selected from alumina, zinc oxide, magnesium oxide and silica and mixtures thereof. More preferably, the binder is alumina.

If binder is present, it is suitably present in an amount of at most 40 wt %, preferably at most 25 wt %, more preferably at most 20 wt % of the overall catalyst. If binder is present it is preferably present in an amount of at least 2 wt %, more preferably at least 5 wt %, most preferably at least 10 wt % of the overall catalyst.

The catalyst of the invention preferably has a bulk density in the range of from 0.4 to 2.0 g/ml, more preferably in the range of from 0.6 to 1.5 g/ml.

When formed into extrudates, the catalyst of the invention preferably has a crush strength of at least 2 N/mm, more preferably at least 4 N/mm and at most 40 N/mm, more preferably at most 30 N/mm.

When formed into tablets, the catalyst of the invention preferably has a top crush strength (based on a 3 mm×3 mm tablet) of at least 40 N/tablet, more preferably at least 60 N/tablet and preferably at most 600 N/tablet, more preferably at most 300 N/tablet.

Also, when formed into tablets, the catalyst of the invention preferably has a side crush strength (based on a 3 mm×3 mm tablet) of at least 10 N/tablet, more preferably at least 20 N/tablet and preferably at most 300 N/tablet, more preferably at most 150 N/tablet.

The catalyst of the invention may be produced by any suitable method known in the art. One suitable method comprises the steps of i) providing an aqueous solution comprising metal salts of zinc, cobalt and aluminium; ii) precipitating the bulk metal oxide using an aqueous alkaline solution; iii) drying the precipitated material; iv) forming catalyst particles from the precipitated material; and v) calcining the thus-formed catalyst particles. The alkali metal promoter may be added during or after any one of these steps.

In step i) of this process, an aqueous solution is provided. Said aqueous solution contains at least one salt of each of cobalt, zinc and aluminium. Each metal may be present within a separate salt, or the aqueous solution may also contain mixed salts of any two or more of the listed metals, or any combination thereof.

The aqueous solution may be prepared by dissolving cobalt, zinc and aluminium separately or together in acid solution, e.g. nitric or acetic acid or by dissolving suitable soluble cobalt, zinc and aluminium compounds in water or dilute acid. Preferred soluble cobalt and zinc compounds are acetates and nitrates, particularly the nitrates. Suitable soluble aluminium compounds are sodium aluminate and aluminium nitrate. Preferably, the pH of the solutions is adjusted, if necessary, to prevent premature precipitation.

The aqueous solution may be formed by dissolving all of the salts in a single aqueous solution. Alternatively, a number of solutions, each containing one or more salts may be provided and mixed together.

Once an aqueous solution containing all of the required salts has been provided, the aqueous solution is treated with an aqueous alkaline solution in order to precipitate out the desired bulk metal oxide. The alkaline solution may be a solution of an organic base and/or an inorganic base. Organic bases include tetraalkyl ammonium hydroxides, amines, pyridine or alkanolamines. Inorganic bases include aqueous ammonia, ammonium carbonate, ammonium bicarbonate and/or a group I or group II metal hydroxide, bicarbonate or carbonate such as sodium hydroxide, sodium carbonate, sodium bicarbonate, potassium hydroxide or potassium carbonate. Inorganic bases are preferred. The concentration of the various components is typically in the range 0.1 to 5 moles/liter and may be selected appropriately to suit the equipment and scale of operation using knowledge known to those skilled in the art.

The precipitated material is then dried. As a first step, the precipitated material may be removed from the bulk of the aqueous solution. This may be carried out by any suitable method, e.g. filtration, centrifugal separation. The precipitated material may then be washed with, for example, water, particularly deionised water, any number of times. Removal of the remaining water may then be carried out by heat treatment. Preferably, the precipitated material is heated to a temperature in the range of from 50 to 150° C., more preferably in the range of from 60 to 130° C. and maintained at such a temperature for a time in the range of from 1 to 24 hours, preferably in the range of from 5 to 15 hours. Alternatively, the precipitated material may be heated to a lower temperature under the application of a vacuum. The skilled person would readily be able to determine a suitable temperature and pressure combination for such a process.

Once the precipitated material is dry, a number of steps are required in order to provide the desired catalyst. These are steps iv) forming catalyst particles; and v) calcining the formed catalyst particles. However, further steps may be carried out before, between, during or after these steps.

The alkali metal promoter may be incorporated into the catalyst in a separate step after the bulk metal oxide has been precipitated. This step may include impregnation, which may be carried out, for example by a pore volume/incipient wetness method. Other suitable impregnation/deposition methods would be known to the skilled person. Suitable sources of promoter in such a method include, but are not limited to, carbonates, nitrates, hydroxides and acetates of the alkali metal to be used. This step may be applied to the precipitated material before or after any of steps iii) to v). Further, separate drying and calcinations steps may be applied after impregnation.

In an alternative embodiment of the invention, the alkali metal promoter may be incorporated into the catalyst material in a co-mulling step. For example, a alkali metal salt may be co-mulled with the precipitated material and, optionally, any binder to be incorporated after drying.

Alternatively, the alkali metal promoter may be incorporated during the precipitation step. In this embodiment, the alkali metal to be incorporated as a promoter may be provided as a separate material or as the precipitant itself, or both.

Binder, if present, may be combined with the precipitated material before or after step iii).

At least a portion of the dried precipitated material from step iii) may be subjected to a further calcinations step, possibly also after combination with binder, before being formed in to catalyst particles in step iv).

The precipitated material may be formed into catalyst particles by any suitable means known in the art, including, but not limited to, pelletisation and extrusion. The catalyst particles may be spheres, pellets, cylinders, rings, or multi-holed pellets, which may be multi-lobed or fluted, e.g. of cloverleaf or tri-lobed cross-section.

The catalyst particles are preferably in the range of from 1 to 20 mm long.

Calcination in step v) and at any other point is preferably carried out at a temperature in the range of from 300 to 800° C., more preferably in the range of from 350 to 700° C.

The present invention also provides a process for the decomposition of nitrous oxide in a gas stream. The gas stream to be provided is any gas stream containing from 50 ppmv to 50 vol % nitrous oxide based on the overall weight of the stream. Preferably, the gas stream contains from 50 ppmv to 40 vol % nitrous oxide. Preferably, the gas stream is a tail gas stream from a chemical process. Typical chemical processes for which the tail gas contains nitrous oxide are those for the production of nitric acid, caprolactam and adipic acid. Other processes in which nitrous oxide may be present in tail gas streams include combustion of fossil fuels, especially coal and waste incineration.

Preferably, the gas stream contains at most 35 wt % water, more preferably at most 20 wt % water, even more preferably at most 16 wt % water, most preferably at most 10 wt % water.

Preferably, the gas stream contains from 1 ppmv to 10 vol % of nitric oxide and nitrogen dioxide ($NO_x$), more preferably in the range of from 5 ppmv to 5 vol % $NO_x$.

The gas stream may also contain oxygen, preferably in the range of from 0.1 vol % to 10 vol %, more preferably in the range of from 0.25 vol % to 6 vol %.

The gas stream preferably contains at most 50 ppmmv ammonia, more preferably at most 35 ppmv ammonia, even more preferably at most 20 ppmv ammonia.

The gas stream may have been subjected to other treatments before being contacted with the catalyst of the present invention. For example, the gas stream may have been subjected to a catalytic DeNOx step. DeNOx is a well known term in the art for the removal of nitrogen oxides of the formula $NO_x$ (e.g. NO, $NO_2$).

The gas stream is contacted with the catalyst of the invention at a temperature of at least 250° C., preferably at least 300° C., most preferably at least 320° C. The temperature is preferably at most 750° C., more preferably at most 700° C.

Suitable gas hourly space velocities (GHSV) are in the range of from 1000 to 200000 $h^{-1}$, preferably the GHSV is in the range of from 2000 to 150000 $h^{-1}$.

Preferably, the gas stream is contacted with the catalyst at a pressure of at least atmospheric pressure. The pressure is preferably at most 20 bar, more preferably at most 15 bar.

Preferably the process for the decomposition of nitrous oxide of the present invention removes at least 90 wt %, more preferably at least 95 wt % and most preferably at least 98 wt % of the nitrous oxide in the gas stream.

The invention will now be illustrated by means of the following Examples, which are not intended to limit the invention.

Example 1 (Comparative Catalyst Precursor)

Cobalt hydroxide and Zinc carbonate in a Co:Zn molar ratio of 6:1 were precipitated using NaOH to yield a mixed oxide. The precipitated material was filtered, washed with deionised water and dried at 120° C. before being calcined at 500° C., ground and sieved. To this material, alumina was mixed in an amount such as to give 10 wt % in the final material. Then, the material was mulled and formed into extrudates. The extrudates were dried at 120° C. and calcined for 3 h at 300° C. This material is referred to as Catalyst 1. The bulk density of this material was 1.17 kg/l.

Example 2 (Of the Invention Catalyst Precursor)

In a vessel, 7.5 liters of deionized water and 540 g of NaOH are mixed under continuous stirring and the temperature is raised to 80° C. To this mixture, a mix of 6 liters deionized water, 1025 ml Nitric acid (701.5 g nitric acid/L) and 300 ml of aluminum nitrate solution was added. The aluminum nitrate solution was prepared by dissolving boehmite in nitric acid and contained 112.4 g Alumina/L and 29 g/L free nitric acid. 450 g of Cobalt hydroxide and 100 g of Zinc carbonate was gradually added to this mixture. The pH of the resulting solution was kept constant at 10.0 and the solution was aged for 4 hours at 80° C. under continuous stirring.

The resulting precipitated material was filtered and washed with 10 liters of 60° C. warm deionised water. The material was then dried at 120° C. for at least 6 hours and ground to less than 0.15 mm particle size. It was then mulled and formed into extrudates. The extrudates were dried at 120° C. and calcined for 3 h at 500° C. The bulk density of this material was 0.78 kg/l. This material is referred to as Catalyst 2.

Example 3

Catalysts 1 and 2 were each loaded in quartz reactor tubes and tested for activity in a $N_2O$ decomposition reaction. The GHSV based on the crushed and sieved particles was 8000 $h^{-1}$. The feed composition was as follows: $N_2O$: 1300 ppmv, NO: 50 ppmv, $O_2$: 2.5 vol %, $H_2O$: 0.75 vol %, $NH_3$: 5 ppmv, the balance was argon. The pressure was maintained at 6 barg and the temperature was increased in 20° C. steps.

Figure 1:
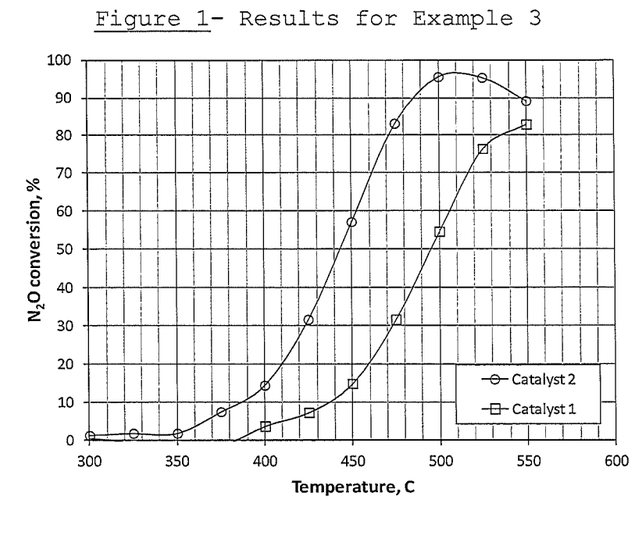
FIGS. 1 to 8 are graphs showing the results of the Examples described herein.

The results of this Example are shown in FIG. 1.

Example 4

Catalysts 1 and 2 were impregnated (pore volume impregnation to incipient wetness) using a solution of potassium carbonate to give a target potassium loading of 1.0 wt %. After potassium impregnation, the catalysts were dried at 120° C. for 2 h and calcined at 500° C. for 4 h. The potassium impregnated versions of catalysts 1 and 2 are referred to as Catalysts 3 and 4 respectively.

Example 5

Figure 2:
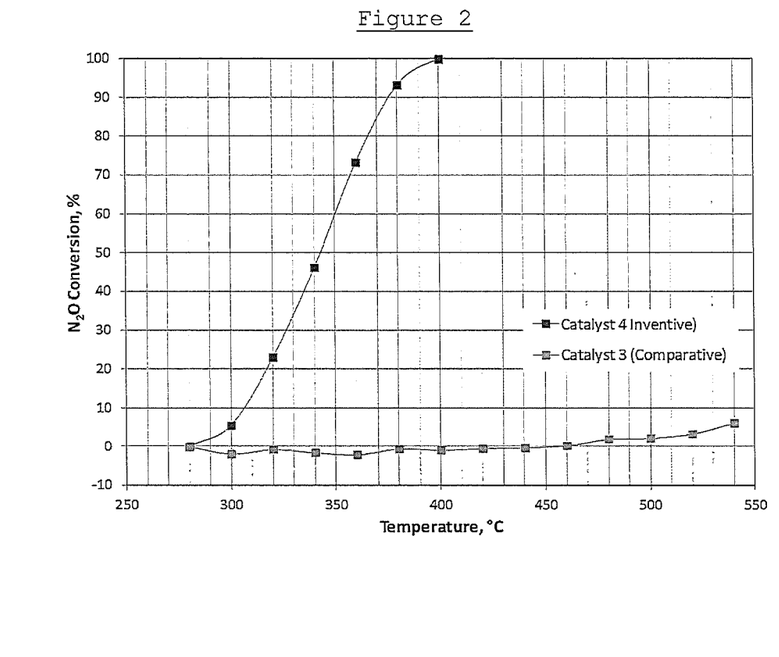

Crushed and sieved particles of Catalyst 3 (comparative) and Catalyst 4 (of the invention) in the size range of 40-80 mesh were each loaded in quartz reactor tubes and tested for activity in the $N_2O$ decomposition reaction. The GHSV based on the crushed and sieved catalyst particles was 8000 $h^{-1}$. The feed composition was as follows: $N_2O$: 1300 ppmv, NO: 50 ppmv, $O_2$: 2.5 vol %, $H_2O$: 0.75 vol %, $NH_3$: 5 ppmv. The balance was argon. The reactor pressure was maintained at 6 barg. The $N_2O$ decomposition activity of the catalyst was measured in the temperature range from 260 to 560° C. by increasing the temperature in 20° C. steps. The gas compositions, measured using a mass spectrometer, were used to calculate the $N_2O$ conversions. The results are shown in FIG. 2.

For the inventive catalyst (Catalyst 4), the temperature for 90% $N_2O$ decomposition was reduced by over 100° C. compared to Catalyst 2, which does not contain the added alkali metal promoter. In contrast, Catalyst 3 (comparative) prepared by the addition of potassium to Catalyst 1, is completely inactive for the decomposition of $N_2O$.

The material prepared by addition of an alumina source to the Cobalt-Zinc precursor precipitation mix is very different in terms of both mechanical and catalytic properties from the Cobalt-Zinc Oxide material prepared without alumina source addition. Addition of alumina source during the precipitation provides a material (Example 4) that can be extruded and has a substantially lower bulk density than the material in Example 3. With the incorporation of potassium as a promoter, Catalyst 4 is highly active for $N_2O$ decomposition.

Example 6 (Of the Invention)

A mixed oxide material was prepared following the precipitation, washing and drying steps as described in Example 2. A portion of the precipitated material was calcined and mixed with the dried material such that the ratio of dried:calcined material by mass was 60:40. To this mixture, 15 wt % alumina, an extrusion aid and peptizing agents were added and mixed in a muller, compacted and extruded through a die to obtain a 2.5 mm trilobe. The extrudates were dried for at least 12 hours at 120° C. and calcined for 3 h at 450° C.

The bulk density of the extrudates was 1.03 kg/L. The side crush strength was 9.8 N/mm.

The extrudates were impregnated with a potassium carbonate solution to give a K loading of 1.0 wt %. The impregnated material was dried by blowing hot air and calcined at 450° C. for 3 hours. This material is referred to as Catalyst 5. It had a bulk density of 1.01 kg/L and a side crush strength of 8.09 N/mm.

Example 7 (Of the Invention)

A mixed oxide material was prepared following the precipitation, washing and drying steps as described in Example 2. The dried material was pressed into tablets of 3×3 mm size after dry mixing with 3 wt % graphite. The tablets were then calcined at 500° C. for 3 hours. The top crush strength was determined to be 84 N/tablet.

A portion of the material was impregnated by carrying out a pore volume impregnation with a solution of potassium carbonate to give a target potassium loading of 1.0 wt %. After potassium impregnation, the material was dried at 120° C. for 2 h and calcined at 500° C. for 4 h. This material is referred to as Catalyst 6.

A separate portion of the material was impregnated by carrying out a pore volume impregnation with a solution of Cesium hydroxide to give a target cesium loading of 2.0 wt %. After Cesium impregnation, the material was dried at 120° C. for 2 h and calcined at 500° C. for 4 h. This material is referred to as Catalyst 7.

Example 8 (Of the Invention)

A mixed oxide material was prepared following the precipitation, washing and drying steps as described in Example 2. The dried material was mixed with 10 wt % alumina, 3 wt % graphite and pressed into 3×3 mm tablets. The tablets were then calcined at 450° C. for 3 hours. The bulk density of the tablets was 1.09 kg/L and the side crush strength was 12.64 N/mm.

The tablets were impregnated with a potassium carbonate solution to give a K loading of 1 wt %. The impregnated material was dried by blowing hot air and calcined at 450° C. for 3 hours. This material is referred to as Catalyst 8. It had a bulk density of 1.09 kg/L and a side crush strength of 13.08 N/mm.

Example 9 (Of the Invention)

A mixed oxide material was prepared following the precipitation, washing and drying steps as described in Example 2. A portion of the precipitated material was calcined and mixed with the dried material such that the ratio of dried:calcined material by mass was 60:40. This mixture was further mixed with 10 wt % alumina, 3 wt % graphite and pressed into 3×3 mm tablets. The tablets were then calcined at 450° C. for 3 hours. The bulk density of the tablets was 1.05 kg/L and the top crush strength was 130 N.

The tablets were impregnated with a potassium carbonate solution to give a K loading of 1 wt %. The impregnated material was dried by blowing hot air and calcined at 450° C. for 3 hours. This material had a bulk density of 1.05 kg/L and is referred to as Catalyst 9.

Example 10 (Of the Invention)

Crushed and sieved particles of Catalysts 5 to 9 in the size range of 40-80 mesh were each loaded in quartz reactor tubes and tested for activity in a $N_2O$ decomposition reaction. The GHSV based on the crushed and sieved particles was 8000 $h^{-1}$. The feed composition was as follows: $N_2O$: 1300 ppmv, NO: 50 ppmv, $O_2$: 2.5 vol %, $H_2O$: 0.75 vol %, $NH_3$: 5 ppmv, the balance was argon. The reactor pressure was maintained at 6 barg. The $N_2O$ decomposition activity of the catalyst was measured in the temperature range from 260 to 560° C. by increasing the temperature in 20° C. steps.

Figure 3:
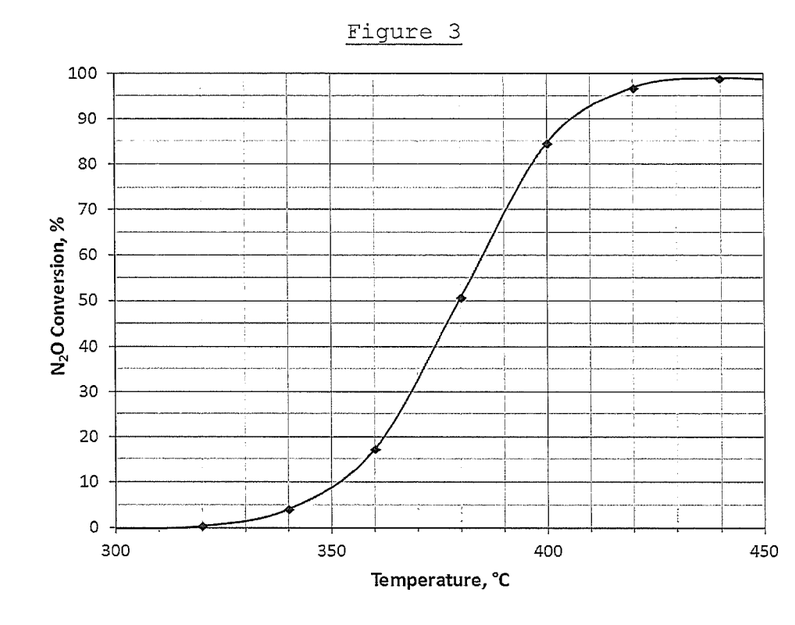
Figure 4:
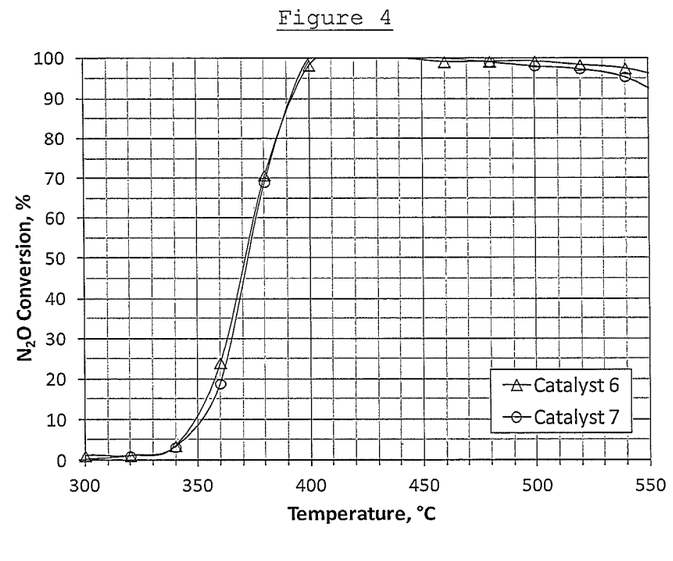
Figure 5:
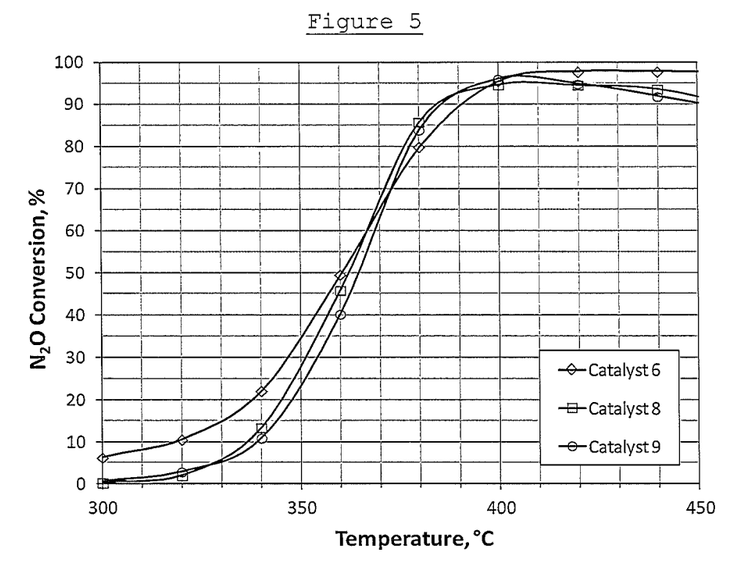

The result for catalysts 5 is shown in FIG. 3. The results for catalysts 6 and 7 are shown in FIG. 4. The results for catalysts 8 and 9 are shown in FIG. 5.

Example 11 (Of the Invention)

Crushed and sieved particles of Catalyst 6 in the size range of 40-80 mesh were each loaded in quartz reactor tubes and tested for activity in a $N_2O$ decomposition reaction. The GHSV based on the crushed and sieved particles was 8000 $h^{-1}$. The feed composition was as follows: $N_2O$: 1300 ppmv, NO: 50 ppmv, $O_2$: 2.5 vol %, $H_2O$: 6.0 vol %, $NH_3$: 5 ppmv, the balance was argon. The reactor was at atmospheric pressure. The $N_2O$ decomposition activity of the catalyst was measured in the temperature range from 260 to 560° C. by increasing the temperature in 20° C. steps.

Catalyst 6 was also tested under the same conditions but at a water concentration of 6.0 vol %.

Figure 6:
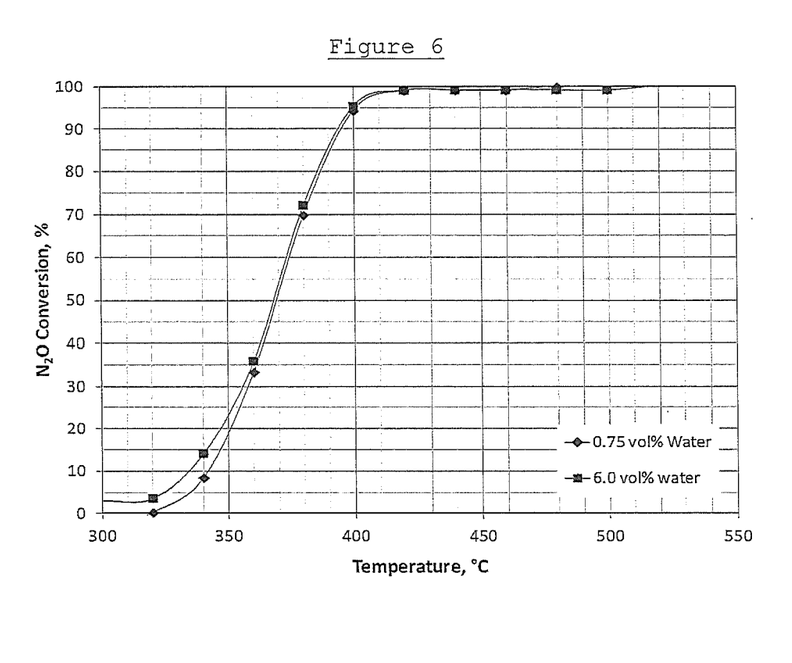

The results from Catalyst 6 tested at these conditions and feeds are shown in FIG. 6.

The results show that the catalyst of the invention performs well even at increased water concentrations in the feed.

Example 12

Catalysts 5, 6, 8 and 9 were tested in a manner similar to Example 10, with the pressure and GHSV remaining same, except that the feed composition was as follows: $N_2O$: 1300 ppmv, NO: 1000 ppmv, $NO_2$: 500 ppmv, $O_2$: 2.5 vol %, $H_2O$: 0.75 vol %, $NH_3$: 0 ppmv, the balance was argon.

Figure 7:
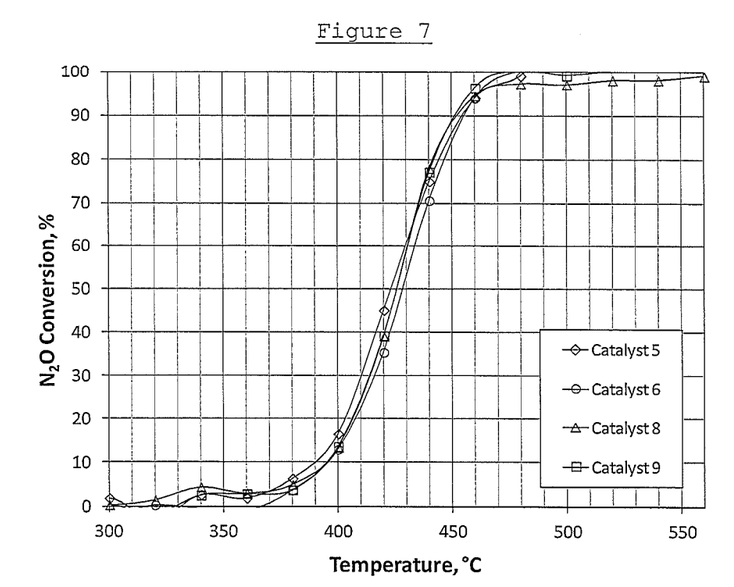

The results shown in FIG. 7 prove that the catalysts are active even when high concentrations of NO and $NO_2$ are present in the feed.

Example 13

The stability of Catalyst 6 at a high temperature in the presence of water in the feed was tested. The GHSV based on the crushed and sieved particles was 100,000 $h^{-1}$. The feed composition was as follows: $N_2O$: 750 ppmv, NO: 50 ppmv, $O_2$: 2.8 vol %, $H_2O$: 3.0 vol %, $NH_3$: 0 ppmv, the balance was argon. The reactor pressure was maintained at 10 barg. The reactor temperature was held at 675° C. for about 140 h and the $N_2O$ conversion over the catalyst was measured every hour.

Figure 8:
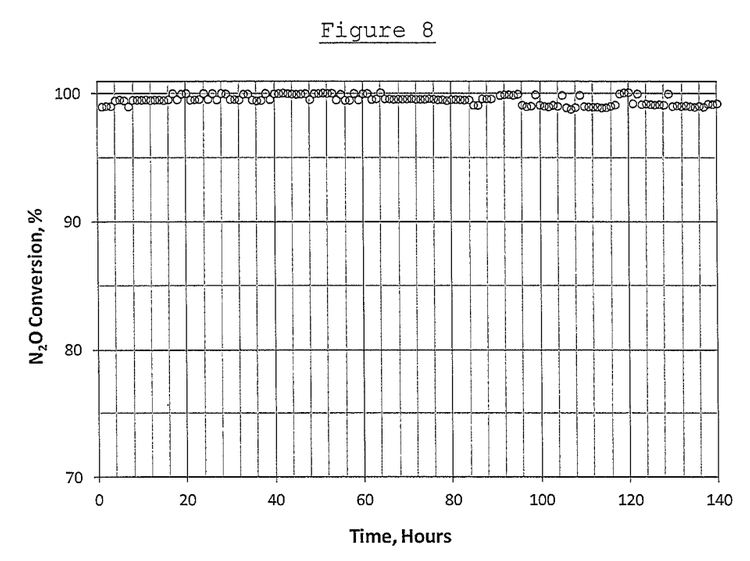

The results from this test are shown in FIG. 8. Complete conversion of $N_2O$ is observed and Catalyst 6 did not show a drop in $N_2O$ decomposition activity throughout the duration of this test indicating that the catalyst is highly stable even in the presence of 3 vol % water in the feed at a temperature of 675° C.

That which is claimed is:

1. A catalyst for the decomposition of nitrous oxide, said catalyst comprising oxides of cobalt, zinc, and aluminium and an alkali metal promoter, wherein the catalyst is in the form of an extrudate and has a side crush strength in the range of from 2 to 40 N/mm.

2. The catalyst of claim 1, wherein the alkali metal promoter is present in at least 0.1 wt % based on the overall weight of the catalyst.

3. The catalyst of claim 1, wherein the alkali metal promoter is selected from potassium, cesium and mixtures thereof.

4. The catalyst of claim 1, wherein the catalyst further comprises a binder, selected from the group of alkaline earth metal oxides, rare earth metal oxides, alumina, zinc oxide, magnesium oxide, silica and mixtures thereof.

5. The catalyst of claim 1, wherein the cobalt is present in an amount of at least 20 and at most 75 wt % based on the overall weight of the catalyst.

6. The catalyst of claim 1, wherein the zinc is present in an amount of at least 3 and at most 20 wt % based on the overall weight of the catalyst.

7. The catalyst of claim 1, wherein the aluminum, excluding any aluminum present in the binder, is present in an amount of at least 2 and at most 20 wt % based on the overall weight of the catalyst.

8. A catalyst for the decomposition of nitrous oxide, said catalyst comprising oxides of cobalt, zinc, and aluminium and an alkali metal promoter, wherein the catalyst is in the form of a tablet and has a top crush strength (based on a 3 mm×3 mm tablet) in the range of from at least 40 N/tablet to at most 300 N/tablet.

9. The catalyst of claim 8, wherein the alkali metal promoter is present in at least 0.1 wt % based on the overall weight of the catalyst.

10. The catalyst of claim 8, wherein the alkali metal promoter is selected from potassium, cesium and mixtures thereof.

11. The catalyst of claim 8, wherein the catalyst further comprises a binder, selected from the group of alkaline earth metal oxides, rare earth metal oxides, alumina, zinc oxide, magnesium oxide, silica and mixtures thereof.

12. The catalyst of claim 8, wherein the cobalt is present in an amount of at least 20 and at most 75 wt % based on the overall weight of the catalyst.

13. The catalyst of claim 8, wherein the zinc is present in an amount of at least 3 and at most 20 wt % based on the overall weight of the catalyst.

14. The catalyst of claim 8, wherein the aluminum, excluding any aluminum present in the binder, is present in an amount of at least 2 and at most 20 wt % based on the overall weight of the catalyst.

* * * * *